Oct. 23, 1956     A. C. DAMAN     2,767,965
DUAL PUMPING AGITATION

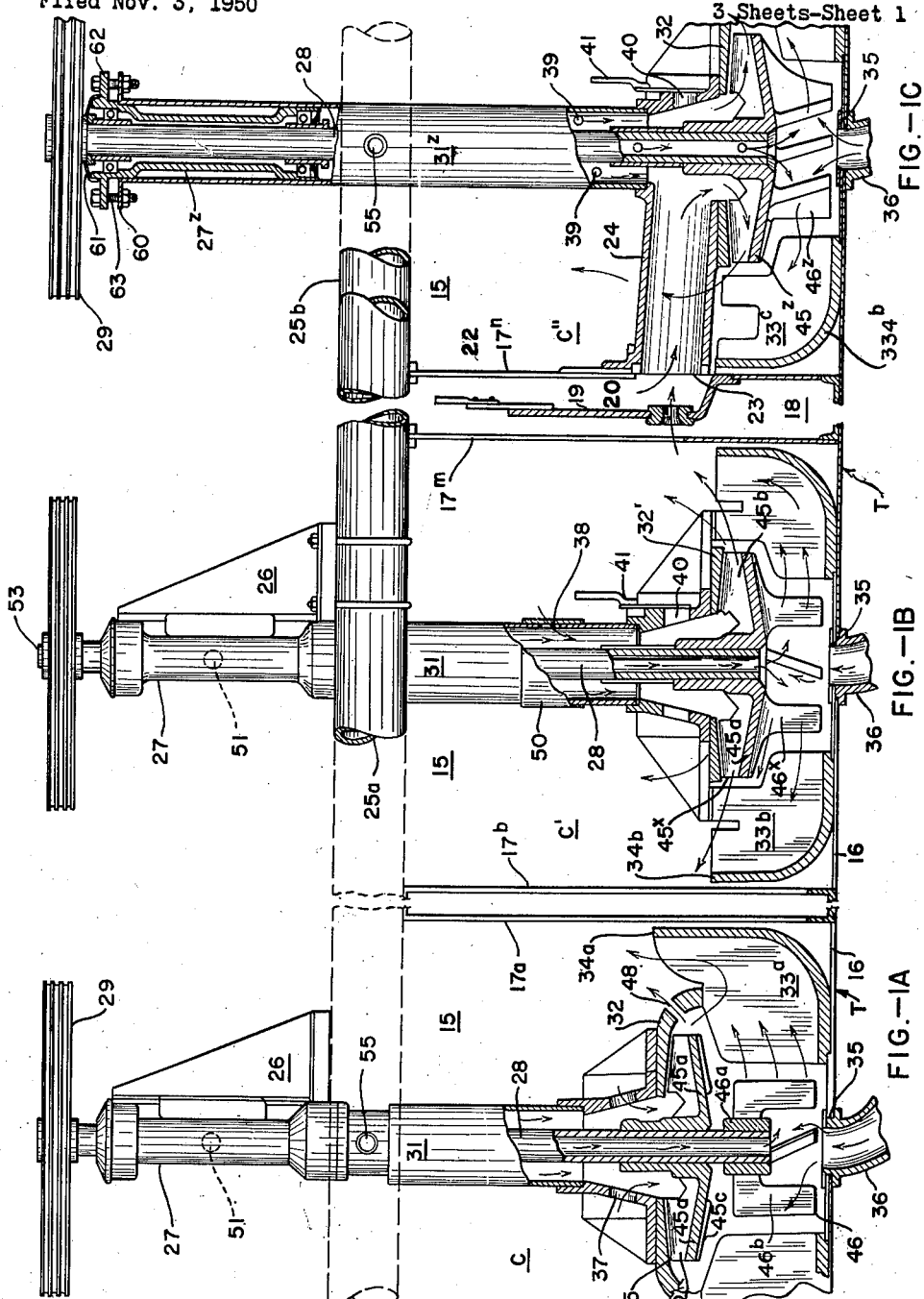

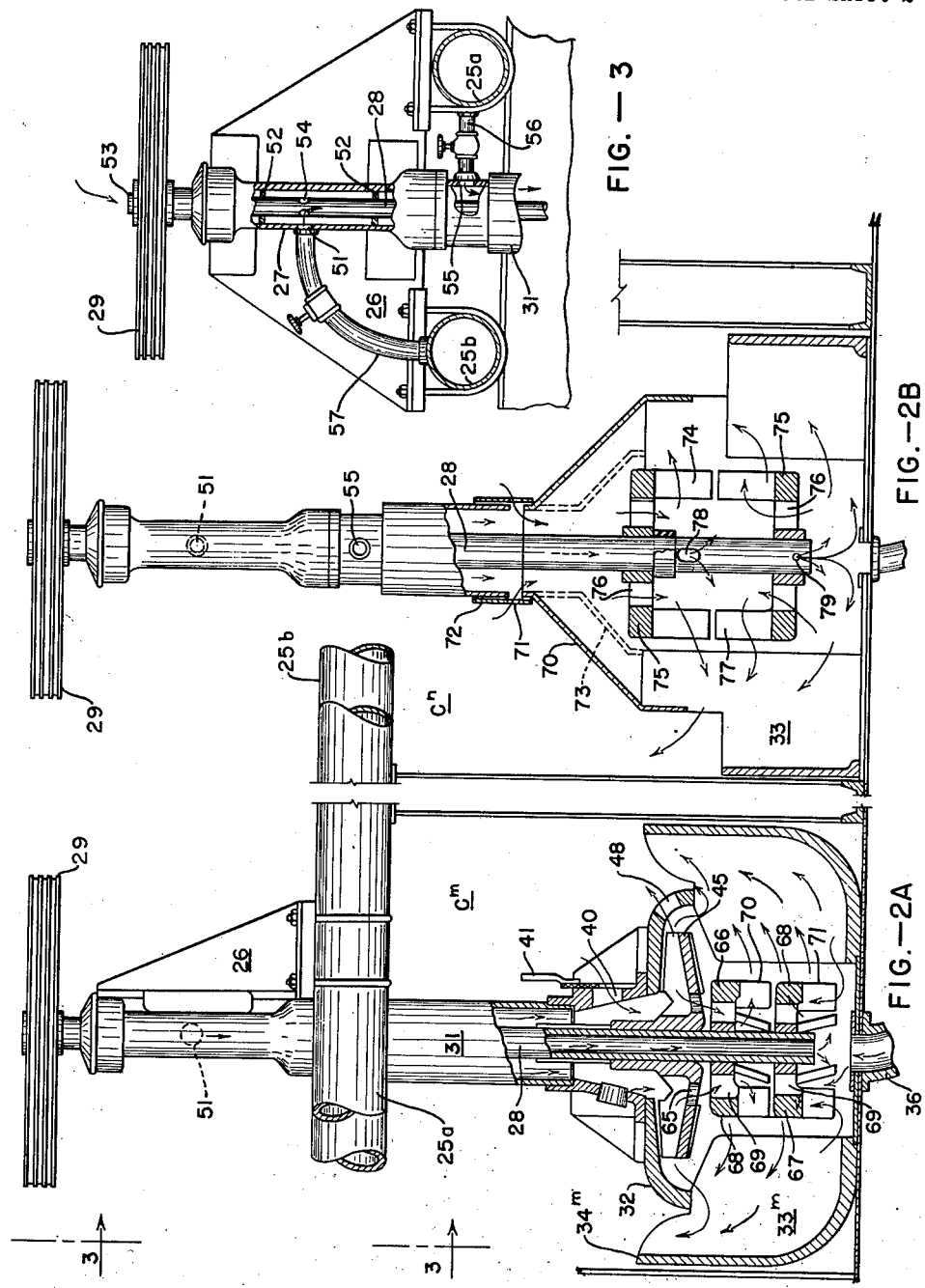

Filed Nov. 3, 1950     3 Sheets-Sheet 3

INVENTOR.
Arthur C. Daman
BY
*H. A. McGrew*
ATTORNEY

United States Patent Office 2,767,965
Patented Oct. 23, 1956

2,767,965

DUAL PUMPING AGITATION

Arthur C. Daman, Denver, Colo., assignor to Mining Process and Patent Company, Denver, Colo., a corporation of Delaware Application November 3, 1950, Serial No. 193,901

14 Claims. (Cl. 261—87)

This invention relates to means for aerating fluent materials such as flotation pulps, in which the pulp is subjected to agitation with one degree of aeration in one zone of the treatment stage and to another degree of aeration and agitation in a second zone within the treatment stage.

In present day flotation practice, many pulps are produced having a considerable degree of fines or slimes containing a substantinal quantity of the valuable constituent to be recovered. If such pulps are treated in a flotation cell in which all sizes are subjected to the same kind and degree of treatment, the concentrate material in fine sizes tends to collect in a zone immediately below the froth zone of the cell. As a consequence, the concentrate material rising through the pulp body in the cell impinges upon the solids in such high density zone and in most instances is unable to penetrate same with the result that much of the areated mineral loses its attachment and falls into the lower portion of the treatment zone.

Likewise, in the circulatory action of the cell, the former practice has required the impeller to function either as an aerator or pump. Therefore, if the impeller is utilized to produce the required degree of aeration, its pumping function is diminished and it functions as an inferior circulatory means. Similarly, if the impeller is operated to produce a desired degree of circulatory action, it produces an inefficient aerating action.

It is an object of the present invention to provide simple, durable and efficient areation apparatus which may be operated to produce a high degree of circulation at one stage of a treatment zone and a high degree of aeration at another stage of the zone.

Another object of the invention is to provide a new and efficient means for aerating fluent pulps and similar bodies in which a selective degree of aeration and circulation is provided at different levels in the treatment zone.

Still another object of the invention is to provide simple, durable and efficient apparatus for inducing a mixing of opposed, vertically-ranging streams of pulp within a flotation cell as a part of the required aeration and agitation of such cell.

A further object of the invention is to provide pulp impelling means for aeration apparatus permitting a selective control of the degree and direction of pulp movement at different levels within the plup body.

Other objects reside in novel details of construction and novel combinations and arrangements of parts, all of which will be described in detail in the course of the following description.

Before undertaking such detailed description, it may be stated the novelty of the present invention resides in the discovery that by providing a plurality of blades depending from a rotary disc or similar impeller structure and so arranged that each blade has its major axis substantially perpendicular to the plane of the disc or body portion and at an inclination to the vertical a controlled circulation is obtained in which the blade assembly will induce descent of or elevation of the pulp stream in accordance with the requirements of a given treatment. Also, by selective control of a gas introduction, one degree of aeration may be provided at one level in the impeller assembly and another degree at a second level therein. Provision is made for selective variation of the circulation and aeration controls, thus permitting a precision control for a variety of different treatments by a single machine.

The practice of this invention will be best understood by reference to the accompanying drawings. In the drawings, in the several views of which like parts have been given corresponding reference numerals, Fig. 1A is a fragmentary, vertical central section through a cell of a flotation machine embodying features of my invention;

Fig. 1B is a fragmentary, vertical central section through a cell of a flotation machine embodying other features of my invention;

Fig. 1C is a fragmentary, vertical central section through a cell of a flotation machine embodying still other features of my invention;

Fig. 2A is a fragmentary, vertical central section through a cell of a flotation machine embodying other features of my invention;

Fig. 2B is a fragmentary, vertical central section through a cell of a flotation machine embodying still other features of my invention;

Fig. 3 is a fragmentary end eelvation of the machine shown in Fig. 2, taken approximately at the position indicated by the lines 3—3, and showing the aeration controls and driving assembly of the machine;

Figure 4:
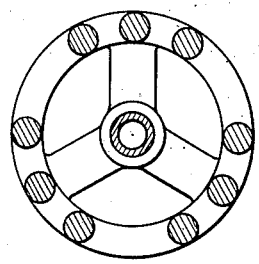
Figs. 4, 5 and 6 are fragmentary horizontal sections through impellers embodying features of my invention and illustrating various shapes of blades utilized in the practice of the invention.

The machine illustrated in Figs. 1 through 3 may be used separately in accordance with regular practice, or any number of such cells may be connected in series, as required. For purposes of description of this application, the three cells are to be considered as joined together as a multi-celled flotation machine. It is to be understood, however, that a multi-cell flotation may utilize a series of joined identical cells or a series of different cells. This machine comprises a tank T having upright sides 15 and ends (not shown) with an interconnecting bottom 16. The interior of tank T is divided by a series of partitions 17a and 17b into a plurality of cells C and C' where a "hog-trough" type of operation is desired, and by another series of partitions 17m and 17n where it is desired to provide a feed compartment 18, as between cells C' and C".

Each such compartment preferably extends through the entire depth of the tank, and contains an upright partitioning member 19 having a sands relief hole 20 in its lower portion, and an adjustable weir member 22 is mounted for up and down movement along member 19 to selectively vary the effective overflow level of the partition. An opening 23 is provided in the partition 17n for connecting with a feed inlet conduit 24 of the next cell in the series.

Two air headers 25a and 25b extend lengthwise along tank T, supported by the end walls of the tank and the several partitions 17a, 17b, 17m and 17n, and provide the air supply for the machine. An upright bracket 26 straddles the headers 25a and 25b centrally of each cell and provides the support for a bearing housing such as the bearing housings 27 of each of the cells C and C'. A rotary shaft 28 is journaled in the bearing housing and carries a sheave 29 at its top by which it is driven by a suitable transmission drive (not shown). A rotary impeller is carried adjacent the lower end of each shaft 28 for conjoint rotation therewith and these impellers may be of different types such as the impeller 45 of cell C, the impeller 45x of cell C' or the impeller 45z of cell C''.

A hollow column 31 extends downwardly from the bearing housing in encompassing relation to each such shaft and is supported at its lower end by a cover member such as the cover member 32 of cell C' or the member 32' of cells C' and C''. The cover member rests on a baffle assembly, such as the baffles 33a, 33b or 33c, which are seated within a bowl or bottom liner, such as the liners 34a or 34b. Preferably, each cell is provided with a bottom opening 35 into which a conduit 36 is fitted to deliver an aerating gas or a pulp in accordance with the treatment requirements.

Provision is made for recirculation pulp through the impeller enclosure by entrainment through openings such as the openings 37 of cell C, the sleeve controlled opening 38 of cell C' or the smaller openings 39 of cell C''. Similarly, an opening such as the opening 40 may be controlled by a gate or sliding valve 41 to permit close control of recirculation.

Various types of impellers may be utilized in the practice of the present invention. As illustrated in cell C, the impeller 45 is mounted on shaft 28 a substantial distance above its lower end and comprises a disc-like body 45a, upper radial blades 45b and lower radial vanes 45c. Another agitator assembly 46 is mounted on shaft 28 in a depending position below impeller 45 and comprises an upper hub portion 46a from which a series of blades 46b depend. These blades have their major axis disposed substantially perpendicular to the disc 45b and are disposed at a slight inclination to the vertical as shown.

In order to provide the necessary aeration for the treatment, gas is introduced through the hollow shaft 28, and also down the hollow column 31, and if desired, additional aerating gas may be supplied through the bottom conduit 36. When an elevating component is to be imparted to the aerated pulp ejected by the impeller, openings in the cover member, such as the opening 48 of cell C may be provided. If the amount of recirculation is to be varied, a slidable sleeve 50 may be adjusted to vary the effective size of opening 38. Likewise, the gate 41 may be adjusted to control recirculation through the opening 40, as previously described.

In the preferred practice of this invention, aerating gas is introduced into hollow shaft 28, through openings 51 in the bearing housing 27. Suitable seals 52 are provided to prevent leakage of gas along shaft 28 as shown in Fig. 3. With such an arrangement, a suitable cap member 53 is provided at the upper end of shaft 28 to prevent escape of gas therefrom, and openings 54 are provided in shaft 28 as the intake for gas delivered into the bearing housing 27.

Gas is introduced into conduit 31 through opening 55, a valve controlled conduit 56 being disposed between opening 55 and header 25a to provide such supply. A similar valve-controlled conduit 57 connects opening 51 with header 25b.

Referring again to the form of the machine illustrated in Fig. 1B, the impeller 45x of cell C' is similar to the impeller 45 of Fig. 1A in that the disc-like body 45a and blades 45b are duplicates of those previously described. However, the depending blade structure 46x is formed as an integral part of the impeller 45x.

The impeller 45z of cell C'' is similar in general arrangement to the impeller 45x except that the depending blade structure 46z while of integral formation is of different shape and arrangement. Another feature of the present invention has been embodied in cell C''. It sometimes is desirable to vary the spacing between the hood 32' and the impeller 45z. As shown, the upper end of conduit 31z has an outwardly flanged portion 60, and a bearing housing 27z is held in pressed fit relation within the upper portion of column 31z and has an upwardly projecting covered end portion 61 and a flange 62 positioned in overhanging relation to flange 60. Bolts 63 interconnect the two flanges and may be used to raise or lower shaft 28 and its depending impeller 45z relative to stationary cover member 32'.

The machines illustrated in Figs. 2A and 2B are generally similar to the machines just described, particularly with reference to their general arrangement and functioning. Corresponding reference numerals have been applied where identical parts are shown. In each of the cells Cm and Cn the agitator unit is of the "squirrel-cage" type, inclusive of certain novel features of the present invention.

Thus in cell Cm the bottom liner member 34m has its upright sides extending to a higher elevation than in the other forms. The baffles 33m of this form extend to the top of the liner 34m and support the cover member 32. An impeller 45m substantially identical to impeller 45 previously described as mounted on the shaft 28 adjacent its lower end has a series of openings 65 permitting descent of a portion of the pulp delivered to the impeller down into the depending "squirrel-cage" assembly carried at the lower end of shaft 28.

This "squirrel-cage" assembly is formed by upper and lower sections 66 and 67 respectively. Each of these sections comprises a disc portion 68 fitted on the shaft having openings 69 adjacent the shaft. Each of the sections has a series of depending blades, the major axes of which are disposed substantially perpendicular to the disc portion and at an inclination to the vertical. The blades 70 of member 66 incline in one direction from the vertical while blades 71 of member 67 are oppositely inclined from the vertical.

As a consequence, the upper blades 70 exert a pumping effect to cause a descent of pulp from impeller 45m through upper openings 69, while blades 71 pump pulp upwardly through the lower opening 69 with a resulting mixing of the opposed streams and ejection of the mixture through the central peripheral portion of the "squirrel cage."

In cell Cn, a conical partition 70 is supported on baffles 33n and has its top surface in closely spaced relation to the lower end of column 31 to form an enclosure for the lower end of shaft 28 and its associated "squirrel-cage" assembly. The space 71 between the column and the partition may be selectively closed by a sliding sleeve 72, and if a more intense agitation is desired within the enclosure, the partition may be shaped as indicated by the dotted line showing at 73.

The "squirrel-cage" of this cell is also a double section type formed by identical members, the uppermost of which has depending blades 74 mounted on a hub portion 75 with central apertures 76, while the lower member has a similar hub portion and central apertures with upstanding blades 77. The shaft 28 is apertured within the "squirrel-cage" as shown at 78. Another opening 79 may be provided near the lower end of shaft 28 to permit upward pumping movement through the lower openings 76 whereby aerated pulp is drawn into the cage and mixed with other pulp pumped downwardly through upper openings 76 and aerated by gas discharged at 78.

Figure 5:
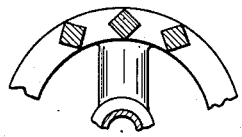
Figure 6:
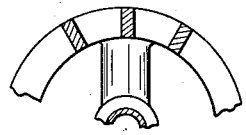

In all the various agitator arrangements thus far described, the blades positioned at an inclination to the vertical may be of round section as shown in Fig. 4 or square section as shown in Fig. 5, or of oblong section as shown in Fig. 6. The same forms may be incorporated in all the other impeller or agitator forms which will now be described.

Figure 7:
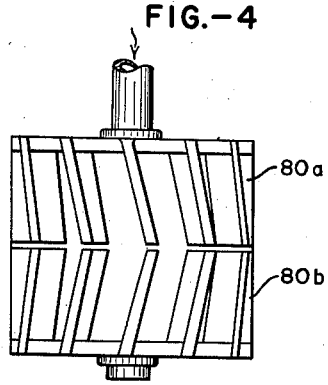
Figs. 7 through 12 are fragmentary side elevations of dual-section impeller blade assemblies embodying features of my invention.
Figure 8:
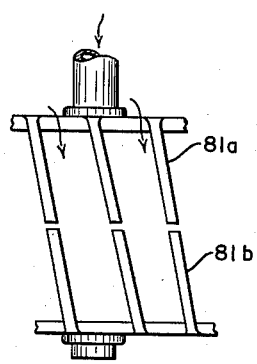
Figure 9:
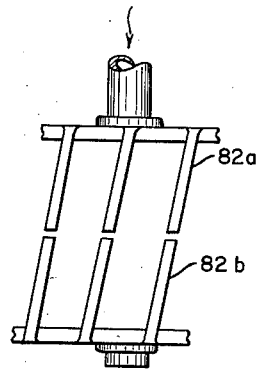

Figs. 7 through 12 show double section agitator members of the "squirrel cage" type. In Fig. 7, the lower blades 80b incline oppositely from upper blades 80a and the adjoining ends of said blades lie in a common vertical plane. In Fig. 8 the lower blades 81b incline the same as upper blades 81a and are in alinement therewith, while the blades 82a and 82b of Fig. 9 employ the same relationship but incline oppositely from the vertical.

Figure 10:
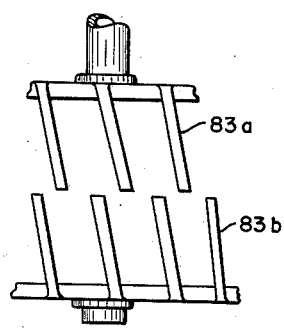
Figure 11:
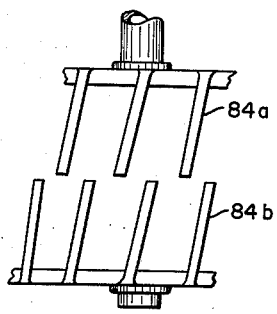
Figure 12:
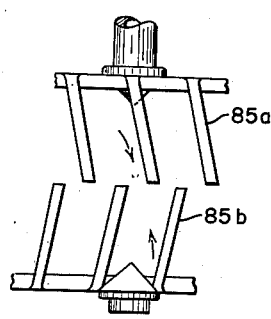

The arrangement shown in Fig. 10 has the blades 83a and 83b parallel but out of alinement while blades 84a and 84b of Fig. 11 are similarly arranged but oppositely inclined, while blades 85a and 85b of Fig. 12 are oppositely inclined and have their ends spaced in the horizontal plane.

Figure 13:
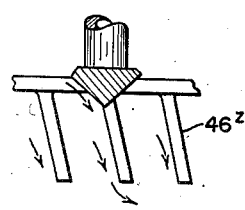
Fig. 13 is a fragmentary side elevation of a single-section impeller blade assembly embodying features of my invention.

Fig. 13 represents the blade arrangement of a single section agitator in which the blades 46z are arranged in groups, here shown as three, such an impeller having been illustrated in cell C" of Fig. 1.

With this understanding of the various arrangements that may be employed, a typical operation will now be described. Referring to the machine shown in Fig. 1A, pulp from any suitable source of supply, such as a ball mill and classifier operating in closed circuit is fed through a conduit into the inlet (not shown) of cell C and distributes therein.

Pulp within the cell enters the impeller enclosure through openings 37, mixes with air descending through column 31 under the pumping influence of impeller 45, and descends onto the dished surface 45b thereof. Some of the aerated pulp acted on by the impeller is ejected under the centrifugal influence through openings 48, while the remainder passes under the outer periphery of hood 32 before beginning its ascent through the cell.

Pulp descending below the level of impeller 45 is subjected to the agitation of agitator 46, which because of the arrangement of blades 46b, pumps material from conduit 36, which may supply aerating gas, or a concentrate from another cell. Additional aerating gas discharges from the lower end of shaft 28 and the gas and pulp mixed by agitator 46 discharges against baffles 33a with portions of the aerated pulp impinging on the stream descending under cover 32.

Aerated mineral rises to the surface of the pulp body where it is removed by overflow, while another portion of the pulp flows through the large openings in partitions 17a and 17b, when the cells of Figs. 1A and 1B are joined as a hog-trough type machine, to constitute the feed to cell C'. In the latter cell the action is repeated with a selective control of recirculation being provided by the positioning of gate 41 and sleeve 50.

The several forms of agitators and aerators described and illustrated herein provide a selective control of the aerating action, such as in a froth flotation treatment for example. This type of control is particularly suited to the treatment of coarse pulps as the depending blade assembly below the rotating disc sets up sufficient agitation adjacent the bottom of the cell to maintain particles in suspension which normally settle and would not remain in suspension under the agitative influence of conventional type impellers. Preferably, the depending blades will be inclined from the vertical to provide an upward component in the agitative movement. However, for many types of pulps, and particularly where bowl-type bottom liners are provided, the vertical blade arrangement will provide a sufficient sweeping action to maintain particles of all sizes in suspension.

With respect to the squirrel-cage type of aerators shown in Figs. 2A and 2B, a high degree of circulation in conjunction with superior aeration is obtained even when the squirrel-cage assembly constitutes the sole agitator of the unit. For example, in cell Cn a provision of the openings 76 adjacent the shaft induces an upward circulation into the interior of the enclosure from the bottom of the cell while other pulp descends through the top openings in a vortex action. The two streams converge or intermingle within the enclosure and provision is made for introduction of an aerating gas at the point of intermixture so as to effectively aerate the pulp before it is ejected by the centrifugal action through the peripheral passages provided by the blade arrangement. The movement through these passages is in the nature of a beating action with the result that the aerating gas is discharged into the main pulp body of the cell in finely dispersed condition.

Provision is also made for a selective degree of aeration by permitting gas to discharge from the lower end of the shaft and also through the opening 78 within the enclosure. This latter discharge rate may be selectively varied by changing the position of the sleeve mounted on the shaft, and any change in the discharge volume at opening 78 produces a related change in the discharge through the bottom of the shaft.

When the upper agitating unit is in the form of a dished impeller, such as the impeller 45 of cell C of Fig. 1A, it is preferable to have the diameter of the depending blade structure substantially less than the diameter of the impeller. With such an arrangement, incoming feed plus recirculating material in finer sizes will be subjected to the agitation and aeration effects of the upper impeller, while the lower agitator is utilized primarily to induce circulation and additional aeration of the coarse sizes which otherwise would not be maintained in suspension.

The various agitator units described and illustrated herein represent preferred arrangements for the practice of the present invention. However, the variety of forms shown is intended to emphasize the broad aspects of the present invention and is not intended to limit the invention beyond the intended scope of the invention as set forth in the hereunto appended claims.

What is claimed is:

1. Aeration apparatus comprising a rotary shaft arranged to be mounted in a body of pulp, an aerating unit having a disc-like body mounted on said shaft, an upper pulp receiving surface spaced from and in proximity to said body, said aerating unit being arranged for conjoint rotation with said shaft, an assembly of blades circumferentially spaced around said shaft and positioned immediately below said body in horizontal annular arrangement, said assembly of blades being arranged for conjoint rotation with said body, each of said blades having its major axis substantially perpendicular to the plane of the body and the length of the blade along its major axis being greater than the thickness of the body portion.

2. Aeration apparatus comprising a rotary shaft arranged to be mounted in a body of pulp, an aerating unit having a disc-like body mounted on said shaft, an upper pulp receiving surface spaced from and in proximity to said body, said aerating unit being arranged for conjoint rotation with said shaft, an assembly of blades circumferentially spaced around said shaft and positioned immediately below said body in substantially annular arrangement, said assembly of blades being arranged for conjoint rotation with said body, each of said blades having its major axis substantially perpendicular to the plane of the body portion and the length of the blade along its major axis being at least equal to the thickness of the body portion.

3. Aeration apparatus comprising a rotary shaft arranged to be mounted in a body of pulp, an aerating unit having a disc-like body mounted on said shaft, an upper pulp receiving surface spaced from and in proximity to said body, said aerating unit being arranged for conjoint rotation with said shaft, a set of upstanding blades disposed at spaced intervals about the upper surface of said body, and a second set of elongated blades disposed immediately below said body in substantial annular arrangement said second set of blades being arranged for conjoint rotation with said body, each said blade extending at a slight angle to a perpendicular from the plane of the body portion.

4. A device according to claim 3 in which said second set of blades is integral with and projects downwardly from said disc-like body.

5. A device according to claim 3 in which said second set of blades is secured to a hub mounted on said shaft and arranged in proximity to the lower surface of said disc-like body.

6. A device according to claim 3 in which said assembly of blades is arranged as a squirrel-cage agitator at the lower end of said shaft.

7. In aeration apparatus, a rotary shaft, a disc-like impeller member carried on the shaft adjacent its lower end for conjoint rotation therewith, and an agitator member mounted for conjoint rotation below and in proximity to the impeller member and including a set of depending blades disposed at spaced intervals about the shaft and extending at a slight angle to a perpendicular from the plane of the impeller member so as to collectively form a circumferential pulp-treating enclosure.

8. A device according to claim 7 in which the angle of said blade is inclined into the direction of rotation.

9. A device according to claim 7 in which the angle of said blades is inclined away from the direction of rotation.

10. Aeration apparatus comprising a hollow, rotary shaft arranged to be mounted in a body of pulp, an aerating unit having a disc-like body mounted on said shaft for rotation in a substantially horizontal plane, an upper pulp receiving surface spaced from and in proximity to said body, said aerating unit being arranged for conjoint rotation with said shaft, and an assembly of blades rotatably mounted on said shaft immediately below said body in substantially squirrel-cage arrangement, each of said blades having its major axis substantially vertical and the length of each blade along its major axis being at least equal to its thickness, and there being at least one discharge passage from said hollow shaft for delivery of aerating gas directly into said squirrel cage arrangement.

11. A device according to claim 10 in which the disc-like body includes at least one opening for a pulp passage into said squirrel-cage arrangement.

12. A device according to claim 10 in which said squirrel-cage arrangement includes upper and lower blades collectively forming an annular enclosure.

13. Aeration apparatus comprising a hollow rotary shaft arranged to be mounted in a body of pulp, an aerating unit having a disc-like body mounted on said shaft for rotation in a substantially horizontal plane, an upper pulp-receiving surface spaced from and in proximity to said body, said aerating unit being arranged for conjoint rotation with said shaft, a set of upstanding blades disposed at spaced intervals about the upper surface of said body, and a second set of elongated blades disposed immediately below said body in substantial annular arrangement, said second set of blades being arranged for conjoint rotation wtih said body, each said blade extending at a slight angle to a perpendicular from the plane of the body portion, and at least one discharge passage from said hollow shaft for delivery of aerating gas directly into the interior of said annular arrangement of blades.

14. Froth flotation apparatus, comprising a cell having an overflow for froth means for feeding pulp to the cell, means for discharging pulp from the cell, and aerating and agitating means in the lower portion of the cell, said latter means comprising a hollow shaft, a disc-like impeller mounted adjacent the lower end of said shaft for conjoint rotation therewith in a substantially horizontal plane, blades on the upper surface of the disc for moving matter descending onto the upper surface of the disc, and a second set of elongated blades extending beneath the disc in substantially annular arrangement, each said blade having its major axis substantially vertical to the plane of rotation of the disc.

References Cited in the file of this patent

UNITED STATES PATENTS

| | | |
|---|---|---|
| 266,991 | Andrews | July 19, 1887 |
| 583,572 | Gordon et al. | June 1, 1897 |
| 629,479 | Tubbs | July 25, 1899 |
| 637,014 | Neuendorff | Nov. 14, 1899 |
| 961,802 | Russell | June 21, 1910 |
| 1,985,153 | Daman | Dec. 18, 1934 |
| 2,238,139 | Tucker | Apr. 15, 1941 |
| 2,393,976 | Daman et al. | Feb. 5, 1946 |

FOREIGN PATENTS

| | | |
|---|---|---|
| 566,830 | Germany | Sept. 27, 1933 |
| 594,496 | Great Britain | Nov. 12, 1947 |
| 703,771 | Germany | Mar. 13, 1941 |